US010194421B2

(12) United States Patent
Wei et al.

(10) Patent No.: US 10,194,421 B2
(45) Date of Patent: Jan. 29, 2019

(54) METHOD AND APPARATUS FOR WIRELESS COMMUNICATIONS

(71) Applicant: INSTITUTE FOR INFORMATION INDUSTRY, Taipei (TW)

(72) Inventors: Chia-Hung Wei, Taipei (TW); Hai-Han Wang, Taipei (TW); Chih-Chiang Wu, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 196 days.

(21) Appl. No.: 15/229,127

(22) Filed: Aug. 5, 2016

(65) Prior Publication Data

US 2017/0041820 A1 Feb. 9, 2017

Related U.S. Application Data

(60) Provisional application No. 62/201,600, filed on Aug. 6, 2015.

(51) Int. Cl.
*H04W 72/04* (2009.01)

(52) U.S. Cl.
CPC .................................. *H04W 72/04* (2013.01)

(58) Field of Classification Search
None
See application file for complete search history.

(56) References Cited

U.S. PATENT DOCUMENTS

| 2013/0237208 | A1* | 9/2013 | Vujcic | H04B 7/15507 |
| | | | | 455/418 |
| 2014/0029514 | A1 | 1/2014 | Yu et al. | |
| 2015/0031377 | A1* | 1/2015 | Charbit | H04W 48/08 |
| | | | | 455/450 |
| 2015/0236825 | A1* | 8/2015 | Park | H04L 5/0035 |
| | | | | 370/329 |

\* cited by examiner

*Primary Examiner* — Chi H Pham
*Assistant Examiner* — Raul Rivas
(74) *Attorney, Agent, or Firm* — CKC & Partners Co., Ltd.

(57) ABSTRACT

A method for wireless communication includes the following steps. A silence command is transmitted to a mobile terminal by a network node when a first predetermined condition occurs. A secondary component carrier of the mobile terminal transitions to a silence state from an activation state according to the silence command and a silence-specific configuration, and is operated in the silence state according to the silence-specific configuration. A signaling message is transmitted to the mobile terminal by the network node when a second predetermined condition occurs. The secondary component carrier transitions to the activation state from the silence state according to the silence-specific configuration and restarts or resumes signal transmissions on the secondary cell in accordance with the signaling message.

16 Claims, 15 Drawing Sheets

METHOD AND APPARATUS FOR WIRELESS COMMUNICATIONS

CROSS REFERENCE TO RELATED APPLICATIONS

This application claims priority to U.S. Provisional Application Ser. No. 62/201,600, filed on Aug. 6, 2015, which is herein incorporated by reference.

BACKGROUND

Field of the Invention

The invention relates to a configuration for wireless communications, and more particularly to a method and apparatus for wireless communications.

Description of Related Art

With development of wireless communications technologies, modern communication systems, such as Long Term Evolution (LTE) and LTE-Advanced (LTE-A) can realize high transmission rate requirements. However, the conventional licensed spectrum resource is a limited resource, and the problem of scarcity of commercial spectrum resource arises with an increasing number of mobile terminals and their transmission throughput requirements. To deal with the problem of scarcity of commercial spectrum resource, corresponding solutions, including LTE in Unlicensed Spectrum (LTE-U), Licensed Assisted Access (LAA), Licensed Shared Access (LSA) and Dynamic Spectrum Sharing (DSS), are already proposed in the industry for using more spectrum resource effectively. How to efficiently manage spectrum resource usage and improve operating efficiency of mobile terminals and network nodes has become an important task in the related fields.

SUMMARY

The objective of the invention is to provide a method and apparatus for wireless communications. By utilizing the method and apparatus of the invention, the state transition time of a secondary component carrier of a mobile terminal exiting the activation state and back to the activation state again can be reduced, and the efficiency of spectrum resource usage can be effectively improved.

One aspect of the invention is directed to a method for wireless communications which includes the following steps. First, a silence command is transmitted to a mobile terminal by a network node when a first predetermined condition occurs. Next, the mobile terminal makes a secondary component carrier of the mobile terminal transition to a silence state from an activation state according to the silence command and a silence-specific configuration and operate in the silence state according to the silence-specific configuration which is used to configure the mobile terminal by the network node. The silence state is defined as a state in which the mobile terminal stops signal transmissions to the network node on a secondary cell but remains monitoring downlink control channel and measuring Reference Signal Received Power (RSRP)/Reference Signal Received Quality (RSRQ) on the secondary cell. The secondary cell is served by the network node which uses a secondary component carrier that corresponds to the secondary component carrier of the mobile terminal, which is in a frequency band of a shared spectrum or an unlicensed spectrum. Then, a signaling message is transmitted to the mobile terminal by the network node when a second predetermined condition occurs. Finally, the mobile terminal makes the secondary component carrier transition to the activation state from the silence state according to the silence-specific configuration and restart or resume signal transmissions on the secondary cell in accordance with the signaling message.

In accordance with one or more embodiments of the invention, the first predetermined condition is that an incumbent user with higher priority to access the frequency band than the mobile terminal is detected by the network node, and the second predetermined condition is that no incumbent user with higher priority to access the frequency band than the mobile terminal is detected by the network node in a predetermined time duration.

In accordance with one or more embodiments of the invention, the first predetermined condition is that the network node fails to contend for access to the frequency band, and the second predetermined condition is that the network node successfully contends for access to the frequency band.

In accordance with one or more embodiments of the invention, the silence-specific configuration includes a temporary channel state information (CSI) reporting configuration, a stop-transmitting timing and a silence-deactivation timer initial value. The stop-transmitting timing is used to indicate to the mobile terminal the timing to stop reporting CSI and to stop message transmissions on the secondary cell. The silence-deactivation timer initial value is used to configure a silence-deactivation timer associated with the secondary component carrier. The silence-deactivation timer is started when the secondary component carrier enters the silence state.

In accordance with one or more embodiments of the invention, the method further includes the following step. Downlink control channel monitoring and RSRP/RSRQ measuring on the secondary cell are stopped at the mobile terminal when the silence-deactivation timer expires.

In accordance with one or more embodiments of the invention, the method further includes the following step. The silence-deactivation timer is restarted by the mobile terminal when a silence-deactivation timer restart command from the network node is received at the mobile terminal.

In accordance with one or more embodiments of the invention, the signaling message is a de-silence command if a time alignment timer (TAT) associated with the secondary cell is expired when the second predetermined condition occurs. The de-silence command is used to control the mobile terminal to perform a de-silence procedure before the secondary component carrier transitions to the activation state from the silence state.

In accordance with one or more embodiments of the invention, the silence command includes a pre-assigned preamble, and the de-silence procedure includes the following steps: report CSI of the secondary cell in accordance with a temporary CSI reporting configuration of the silence-specific configuration; transmit the pre-assigned preamble to the network node; and receive a timing advance (TA) value from the network node.

In accordance with one or more embodiments of the invention, the signaling message includes scheduling information for restarting or resuming signal transmissions on the secondary cell if a TAT associated with the secondary cell is not expired when the second predetermined condition occurs.

Another aspect of the invention is directed to an apparatus for wireless communications which includes a transceiver unit and a processing unit. The transceiver unit is configured to perform signal transmissions and receptions on a secondary cell. The transceiver unit is associated with a secondary component carrier of the apparatus, and the secondary cell is served by a network node and is operated in a frequency band of a shared spectrum or an unlicensed spectrum. The processing unit is configured to perform the following steps. First, a silence command is received from the network node. Next, the secondary component carrier is made to transition to a silence state from an activation state according to the silence command and a silence-specific configuration and to operate in accordance with the silence-specific configuration which is used to configure the apparatus by the network node. The silence state is defined as a state in which the apparatus stops signal transmissions on the secondary cell but remains monitoring downlink control channel and measuring RSRP/RSRQ on the secondary cell. Then, a signaling message is received from the network node. Finally, the secondary component carrier is made to transition to the activation state from the silence state according to the silence-specific configuration and to restart or resume signal transmissions on the secondary cell in accordance with the signaling message.

In accordance with one or more embodiments of the invention, the silence-specific configuration comprises a temporary CSI reporting configuration, a stop-transmitting timing and a silence-deactivation timer initial value. The stop-transmitting timing is used to control the apparatus to stop reporting CSI and to stop message transmissions on the secondary cell at the indicated timing. The silence-deactivation timer initial value is used to configure a silence-deactivation timer associated with the secondary component carrier. The silence-deactivation timer is started when the secondary component carrier enters the silence state.

In accordance with one or more embodiments of the invention, the silence command includes a pre-assigned preamble, and the processing unit is further configured to perform the following steps if the signaling message is a de-silence command: report CSI of the secondary cell in accordance with a temporary CSI reporting configuration of the silence-specific configuration; transmit the pre-assigned preamble to the network node; and receive a TA value from the network node.

In accordance with one or more embodiments of the invention, the processing unit is further configured to perform the following step: stop monitoring downlink control channel and measuring RSRP/RSRQ on the secondary cell when the silence-deactivation timer expires.

In accordance with one or more embodiments of the invention, the processing unit is further configured to perform the following step: restart the silence-deactivation timer when a silence-deactivation timer restart command is received from the network node.

Another aspect of the invention is directed to an apparatus for wireless communications which includes a transceiver unit and a processing unit. The apparatus is configured to serve a secondary cell using a secondary component carrier that corresponds to a secondary component carrier of a mobile terminal, and the secondary cell is operated in a frequency band of a shared spectrum or an unlicensed spectrum. The transceiver unit is configured to perform signal transmissions and receptions on the secondary cell. The processing unit is configured to perform the following steps. First, a silence command is transmitted to the mobile terminal when a first predetermined condition occurs. The silence command is used to indicate to the mobile terminal to make the secondary component carrier transition to a silence state from an activation state according to the silence command and a silence-specific configuration and operate in accordance with the silence-specific configuration which is used to configure the mobile terminal by the apparatus. The silence state is defined as a state in which the mobile terminal stops signal transmissions on the secondary cell but remains monitoring downlink control channel and measuring RSRP/RSRQ on the secondary cell. Next, a signaling message is transmitted to the mobile terminal for indicating to the mobile terminal to make the secondary component carrier transition to the activation state from the silence state and restart or resume signal transmissions on the secondary cell in accordance with the silence-specific configuration when a second predetermined condition occurs.

In accordance with one or more embodiments of the invention, the first predetermined condition is that an incumbent user with higher priority to access the frequency band than the mobile terminal is detected by the apparatus, and the second predetermined condition is that no incumbent user with higher priority to access the frequency band than the mobile terminal is detected for a predetermined time duration by the apparatus.

In accordance with one or more embodiments of the invention, the first predetermined condition is that the apparatus fails to contend for access to the frequency band, and the second predetermined condition is that the apparatus successfully contends for access to the frequency band.

In accordance with one or more embodiments of the invention, the silence-specific configuration includes a temporary CSI reporting configuration, a stop-transmitting timing and a silence-deactivation timer initial value. The stop-transmitting timing is used to indicate to the mobile terminal the timing to stop reporting CSI and to stop message transmissions on the secondary cell. The silence-deactivation timer initial value is used to configure a silence-deactivation timer associated with the secondary component carrier. The silence-deactivation timer is started when the secondary component carrier enters the silence state.

In accordance with one or more embodiments of the invention, the silence command includes a pre-assigned preamble, and the signaling message is a de-silence command if a TAT associated with the secondary cell is not expired when the second predetermined condition occurs. The de-silence command is used to control the mobile terminal to perform the following steps before the secondary component carrier transitions to the activation state from the silence state: report CSI of the secondary cell in accordance with a temporary CSI reporting configuration of the silence-specific configuration, transmit the pre-assigned preamble to the apparatus; and receive a TA value from the apparatus.

In accordance with one or more embodiments of the invention, the signaling message includes scheduling information for restarting or resuming signal transmissions on the secondary cell if a TAT associated with the secondary cell is not expired when the second predetermined condition occurs.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Figure 1:
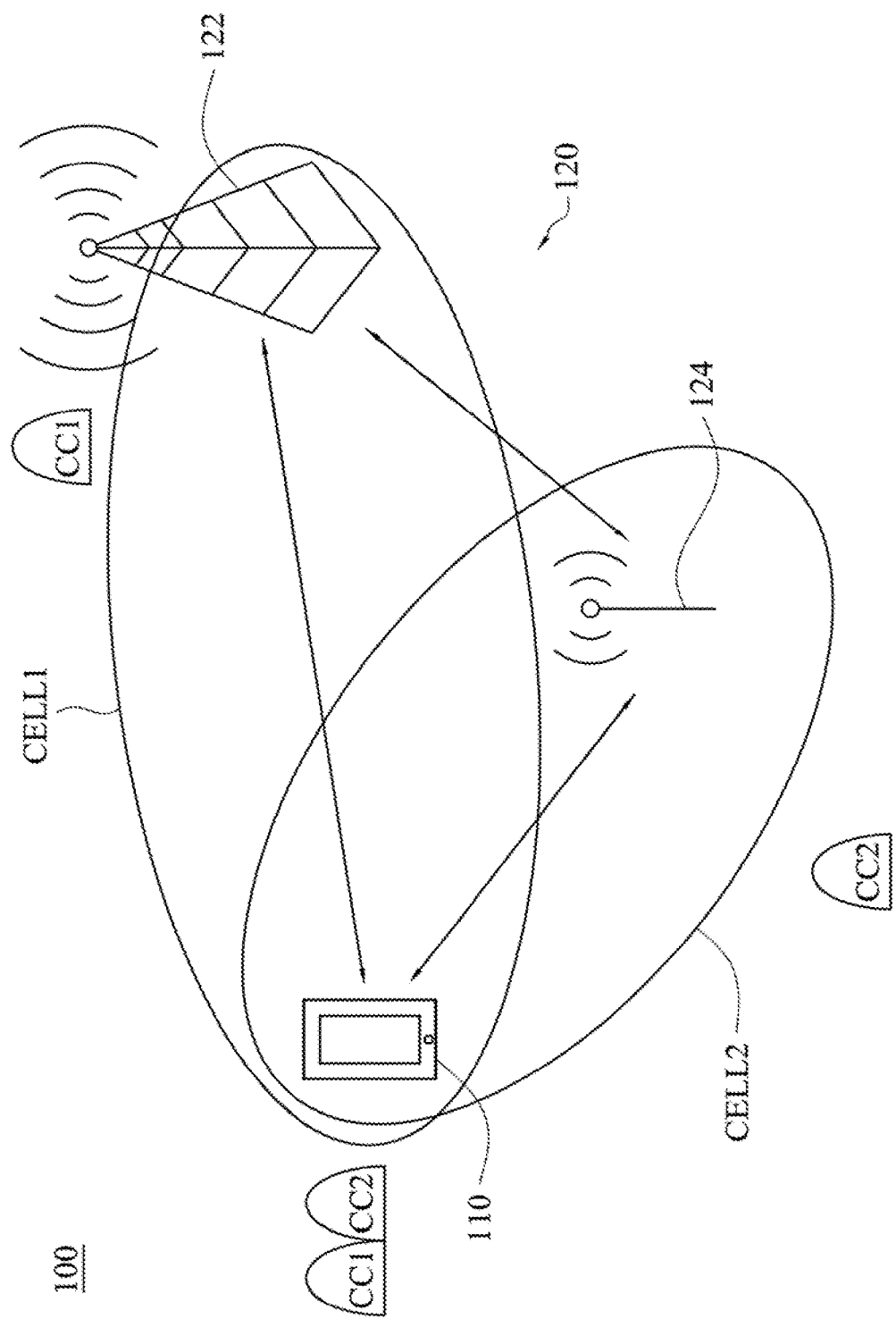
FIG. 1 illustrates a schematic diagram of a communication system in accordance with some embodiments of the invention.

Referring to FIG. 1, which illustrates a schematic diagram of a communication system 100 in accordance with some embodiments of the invention. The communication system 100 may be a communication system adopting Dynamic Spectrum Sharing (DSS), Licensed Assisted Access (LAA), Long Term Evolution in Unlicensed Spectrum (LTE-U) or another similar technology, including a mobile terminal 110 and a network terminal 120 relative to the mobile terminal 110. The network terminal 120 includes network nodes 122 and 124 which respectively serve cells CELL1 and CELL2 for the mobile terminal 110. The network node 122 or 124 may be an Evolved Node B (eNB), a Macro Cell, a Small Cell, a Micro Cell, a wireless access point or another similar node. The mobile terminal 110 may be a communication device supporting Carrier Aggregation (CA), and aggregates component carriers CC1 and CC2. The component carrier CC1 is a primary component carrier of the mobile terminal 110 which is configured to perform wireless communications with the network node 122 on the cell CELL1 (i.e. primary cell). The component carrier CC2 is a secondary component carrier of the mobile terminal 110 which is configured to perform wireless communications with the network node 124 on the cell CELL2 (i.e. secondary cell). The cells CELL1 and CELL2 may be adjacent to each other or separated from each other.

It is noted that the communication system 100 illustrated in FIG. 1 is merely for exemplary purposes but is not intended to limit the scope of the invention. For example, in other embodiments of the invention, the mobile terminal 110 may have multiple independent secondary component carriers, and each of the secondary component carriers is associated with an independent secondary cell. Moreover, in other embodiments of the invention, the network nodes 122 and 124 may be integrated into an entity.

Figure 2:
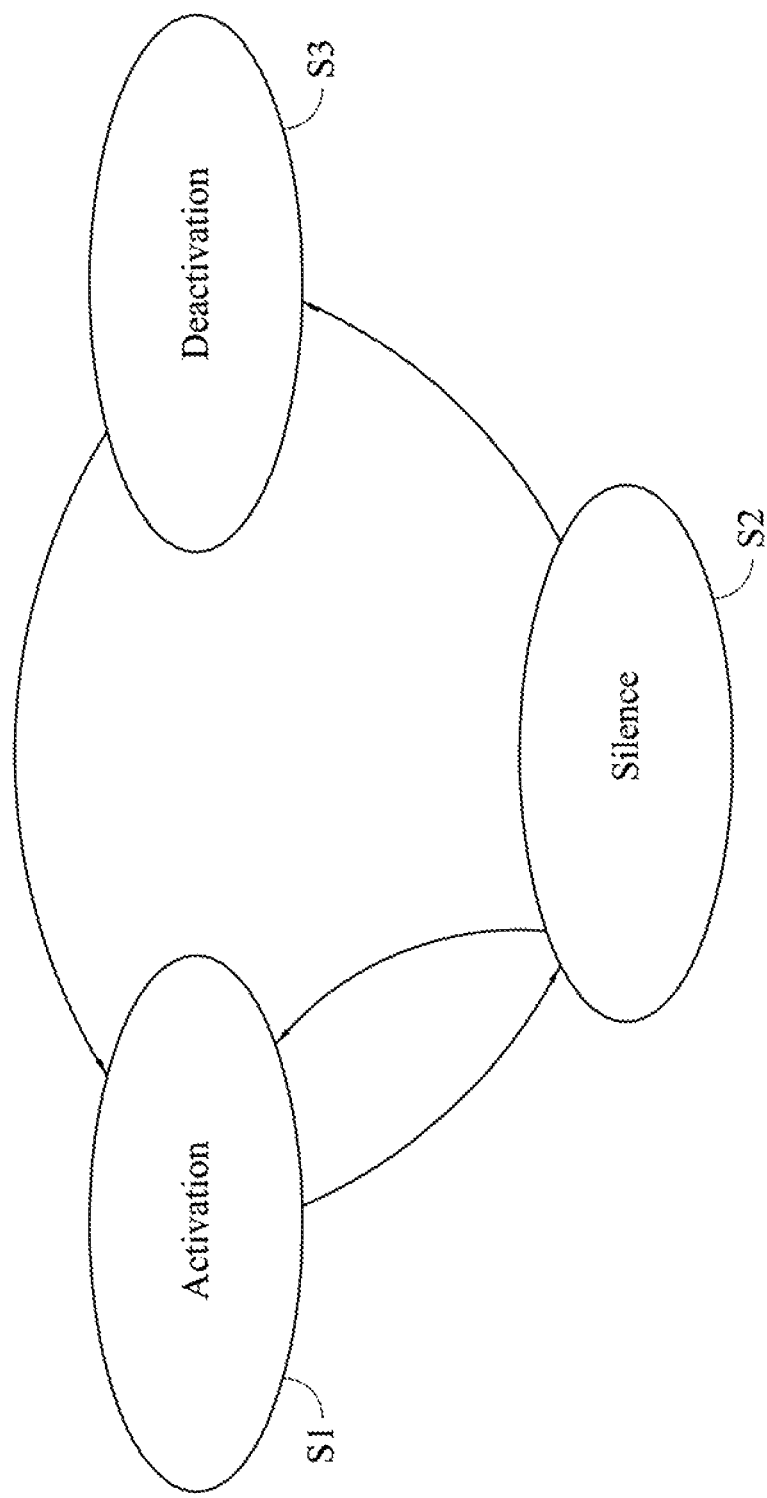
FIG. 2 illustrates a state transition diagram of a secondary component carrier of a mobile terminal in accordance with some embodiments of the invention.

Referring to FIG. 2, which illustrates a state diagram of a secondary component carrier of a mobile terminal in accordance with some embodiments of the invention. The mobile terminal may be the mobile terminal 110 in FIG. 1 or another mobile terminal of a communication system similar to that shown in FIG. 1. The secondary component carrier of the mobile terminal includes three states which are respectively an activation state S1, a silence state S2 and a deactivation state S3. When the secondary component carrier is in the activation state S1, the mobile terminal performs signal transmissions on a secondary cell, reports channel quality information (CQI)/precoding matrix indicator (PMI)/rank Indicator (RI)/precoding type indicator (PTI), transmits a sounding reference signal (SRS) and monitors a downlink control channel on the secondary cell. When the secondary component carrier is in the silence state S2, the mobile terminal stops signal transmissions on the secondary cell (including stopping CQI/PMI/RI reporting, stopping message transmissions on the secondary cell and/or stopping SRS transmissions) but remains monitoring downlink control channel and measuring Reference Signal Received Power (RSRP)/Reference Signal Received Quality (RSRQ) on the secondary cell. When the secondary component carrier is in the deactivation state S3, the mobile terminal stops signal transmissions on the secondary cell (including stopping CQI/PMI/RI reporting, stopping message transmissions on the secondary cell and/or stopping SRS transmissions), and stops monitoring downlink control channel and measuring RSRP/RSRQ on the secondary cell. The transitions from the activation state S1 to the silence state S2, from the silence state S2 to the activation state S1 and from the silence state S2 to the deactivation state S3 are described in the following paragraphs.

Figure 3:
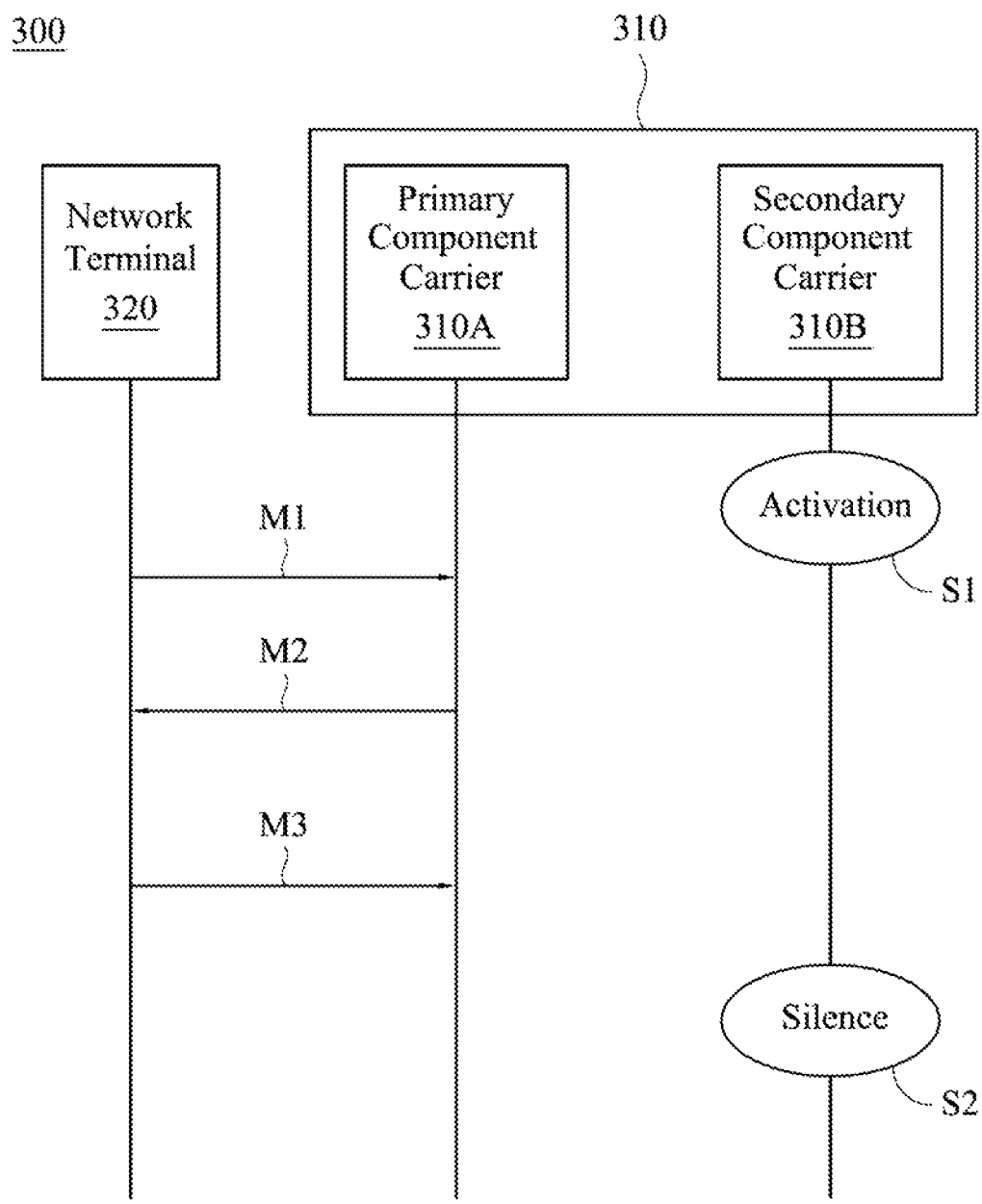
FIG. 3 illustrates a message sequence chart of a wireless communication control method in accordance with some embodiments of the invention.

Referring to FIG. 3, which illustrates a message sequence chart of a wireless communication control method 300 in accordance with some embodiments of the invention. The wireless communication control method 300 is performed in a communication system which includes a mobile terminal 310 and a network terminal 320. The mobile terminal 310 adopts CA, and aggregates a primary component carrier 310A and a secondary component carrier 310B. The network terminal 320 includes a network node for performing wireless communications with the mobile terminal 310 and controlling the mobile terminal 310 to access the wireless network. The mobile terminal 310 may be the mobile terminal 110 in FIG. 1 or another mobile terminal of a communication system similar to that shown in FIG. 1. The network terminal 320 may serve a primary cell and a secondary cell for the mobile terminal 310 through the network node, such that the primary component carrier 310A and the secondary component carrier 310B of the mobile terminal 310 can perform wireless communications with the network terminal 320 on the primary cell and the secondary cell, respectively. If the communication system adopts DSS, the secondary cell is operated in a frequency band of a shared spectrum; if the communication system adopts LAA, the secondary cell is operated in a frequency band of an unlicensed spectrum.

The wireless communication control method 300 is used to make the secondary component carrier 310B of the mobile terminal 310 transition to the silence state S2 from the activation state S1. First, when the secondary component carrier 310B of the mobile terminal 310 is in the activation state S1, the network terminal 320 transmits a silence-specific configuration M1 to the primary component carrier 310A of the mobile terminal 310. The silence-specific configuration M1 may include a temporary channel state information (CSI) reporting configuration, a stop-transmitting timing and a silence-deactivation timer initial value, and is used for configuring the mobile terminal 310. The temporary CSI reporting configuration is used to indicate to the mobile terminal 310 the configuration of temporary CSI reporting when reporting the CSI of the secondary cell after receiving a de-silence command from the network node. The stop-transmitting timing is used to indicate to the mobile terminal 310 the timing to stop reporting CSI and to stop message transmissions on the secondary cell when receiving a silence command from the network node. The silence-deactivation timer initial value is used to configure the silence-deactivation tinier associated with the secondary component carrier. The CSI reporting period configured according to the temporary CSI reporting configuration may be shorter than the reporting period of the CSI transmitted when the secondary component carrier 310B of the mobile terminal 310 is in the activation state S1.

After receiving the silence-specific configuration M1, the mobile terminal 310 performs configurations related to wireless communications according to the silence-specific configuration M1, and transmits a silence-specific configuration complete message M2 to the network terminal 320 through the primary component carrier 310A for replying to the network terminal 320 that the silence-specific configuration M1 is received and the configuration according to the silence-specific configuration M1 is accomplished.

Next, when a predetermined condition occurs, the network terminal 320 transmits a silence command M3 to the primary component carrier 310A of the mobile terminal 310 for indicating to the mobile terminal 310 to make the secondary component carrier 310B to transition to the silence state S2 from the activation state S1 and operate in the silence state S2 according to the silence-specific configuration M1. If the communication system adopts DSS, the predetermined condition is that an incumbent user with higher priority to access the frequency band of the secondary cell than the mobile terminal 310 is detected in the secondary cell by the network terminal 320. Oppositely, if the communication system adopts LAA, the predetermined condition is that the network terminal 320 fails to contend for access to the frequency band of the secondary cell. Alternatively, in some embodiments, if the communication system adopts LAA, the predetermined condition is that the network terminal 320 does not have any data to be transmitted to the secondary component carrier 310B of the mobile terminal 310 in a predetermined time duration.

In some embodiments, the silence command M3 includes a pre-assigned preamble which can be used in the transition process of the secondary component carrier 310B of the mobile terminal 310 from the silence state S2 to the activation state S1.

After receiving the silence command M3, the mobile terminal 310 silences the secondary cell, i.e., stops signal transmissions on the secondary cell according to the stop-transmitting timing of the silence-specific configuration M1 (including stopping CQI/PMI/RI reporting, stopping message transmissions on the secondary cell and/or stopping SRS transmissions), but remains monitoring downlink control channel and measuring RSRP/RSRQ on the secondary cell. The secondary component carrier 310B transitions to the silence state S2 from the activation state S1, and the mobile terminal 310 starts the silence-deactivation timer associated with the secondary component carrier.

Figure 4A:
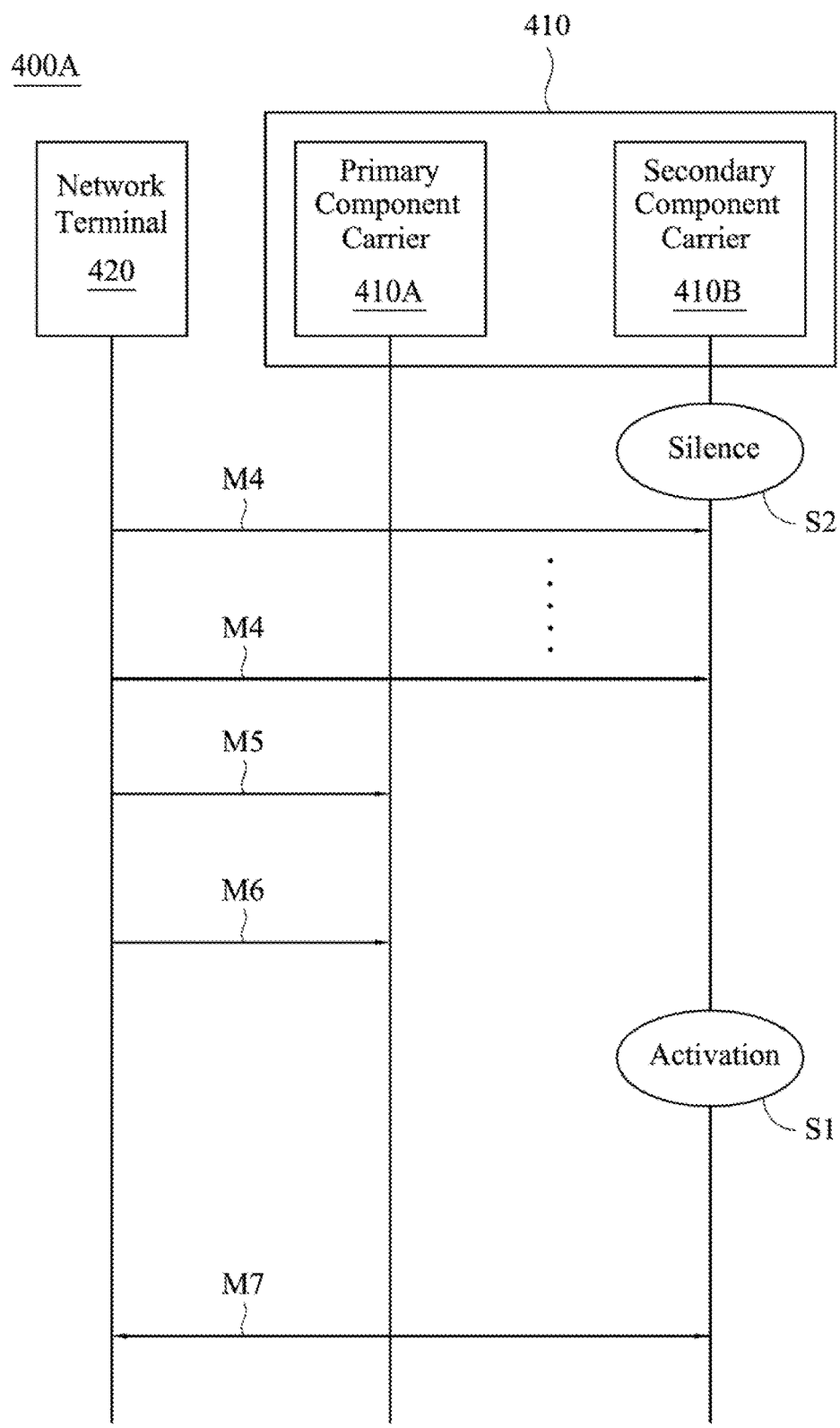
FIGS. 4A and 4B illustrate message sequence charts of a wireless communication control method in accordance with some embodiments of the invention.

Referring to FIG. 4A, which illustrates a message sequence chart of a wireless communication control method 400A in accordance with some embodiments of the invention. The wireless communication control method 400A is performed in a communication system which includes a mobile terminal 410 and a network terminal 420. The mobile terminal 410 includes a primary component carrier 410A and a secondary component carrier 410B. The network terminal 420 includes a network node for performing wireless communications with the mobile terminal 410 and controlling the mobile terminal 410 to access the wireless network. The mobile terminal 410 may be the mobile terminal 110 in FIG. 1 or another mobile terminal of a communication system similar to that shown in FIG. 1. The network terminal 420 may serve a primary cell and a secondary cell for the mobile terminal 410 through the network node, such that the primary component carrier 410A and the secondary component carrier 410B of the mobile terminal 410 can perform wireless communications with the network terminal 420 on the primary cell and the secondary cell, respectively. If the communication system adopts DSS, the secondary cell is operated in a frequency band of a shared spectrum; if the communication system adopts LAA, the secondary cell is operated in a frequency band of an unlicensed spectrum. The wireless communication control method 400A in FIG. 4A may be a continuation of the wireless communication control method 300 in FIG. 3, i.e., the mobile terminal 410, the primary component carrier 410A, the secondary component carrier 410B and the network terminal 420 respectively correspond to the mobile terminal 310, the primary component carrier 310A, the secondary component carrier 310B and the network terminal 320 in FIG. 3.

The wireless communication control method 400A is used to make the secondary component carrier 410B of the mobile terminal 410 transition to the activation state S1 from the silence state S2. First, when the secondary component carrier 410B of the mobile terminal 410 is in the silence state S2, the network terminal 420 transmits a primary synchronization signal (PSS)/secondary synchronization signal (SSS)/cell-specific reference signal (CRS) M4 on the secondary cell to the secondary component carrier 410B of the mobile terminal 410 for synchronization of the secondary cell. If the network terminal 420 transmits a silence-deactivation tinier restart command M5 to the primary component carrier 410A of the mobile terminal 410, the mobile terminal 410 restarts the silence-deactivation timer associated with the secondary cell.

Next, when a predetermined condition occurs and the time alignment timer (TAT) is not expired, the network terminal 420 transmits a scheduling information M6 to the primary component carrier 410A of the mobile terminal 410 for indicating to the mobile terminal 410 to make the secondary component carder 410B transition to the activation state S1 from the silence state S2 and restart or resume signal transmissions on the secondary cell (e.g., to transmit a data message M7 to the network terminal 420, or to receive a data message M7 from the network terminal 420). If the communication system adopts DSS, the predetermined condition is that no incumbent user with higher priority to access the frequency band of the secondary cell than the mobile terminal 410 is detected in the secondary cell by the network terminal 420. Oppositely, if the communication system adopts LAA, the predetermined condition is that the network terminal 420 successfully contends for access to the frequency band of the secondary cell.

The predetermined condition in FIG. 4A corresponds to the predetermined condition in FIG. 3. That is, the predetermined conditions in FIGS. 3 and 4A are the conditions for the communication system adopting DSS or LAA.

Figure 4B:
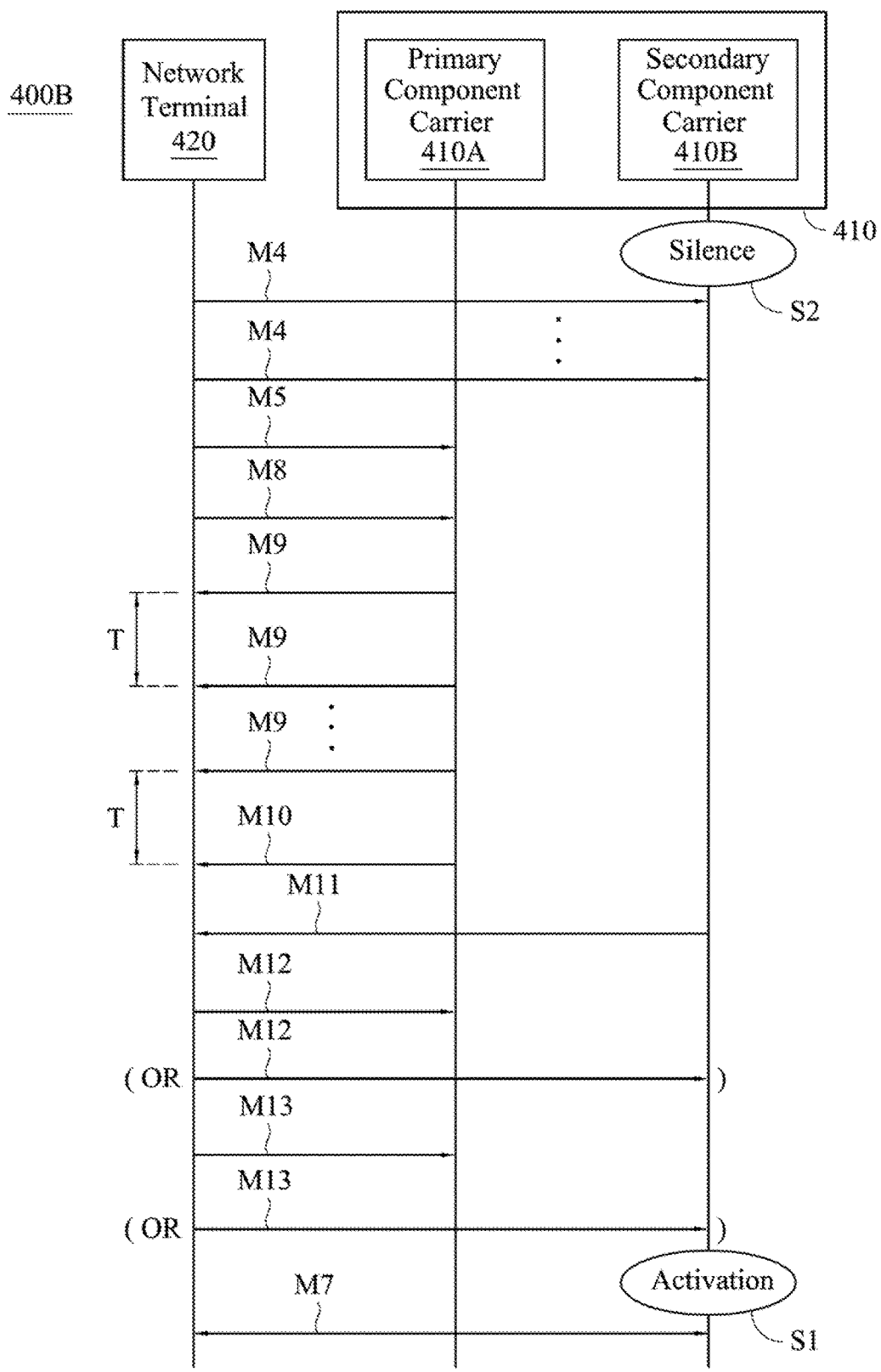

Referring to FIG. 4B, which illustrates a message sequence chart of a wireless communication control method 400B in accordance with some embodiments of the invention. The wireless communication control methods 400A and 400б are performed under the same communication system environment. The difference between the wireless communication control methods 400A and 400б is that, in the wireless communication control method 400б, the TAT is expired when a predetermined condition occurs. In the following, only the different part from the wireless communication control method 400A is described below, and the same part are described in the paragraphs relative to the wireless communication control method 400A, and descriptions thereof are not repeated herein.

When a predetermined condition occurs and the TAT is expired, the network terminal 420 transmits a de-silence command M8 to the primary component carrier 410A of the mobile terminal 410 for indicating to the mobile terminal 410 to make the secondary component carrier 410B transition to the activation state S1 from the silence state S2 according to the silence-specific configuration. After receiving the de-silence command M8, the mobile terminal 410 performs a de-silence procedure. First, the mobile terminal 410 transmits the CQI of the secondary cell to the network terminal 420 through the primary component carrier 410A. If the channel quality of the secondary cell is so poor that the mobile terminal 410 can not perform signal transmissions on the secondary cell through the secondary component carrier 410B, the mobile terminal 410 keeps transmitting the CQI of the secondary cell (e.g. a CQI M9 shown in FIG. 4B) to the network terminal 420 through the primary component carrier 410A once every time interval T. The contents of such CQI indicates that the mobile terminal 410 still cannot perform signal transmissions on the secondary cell through the secondary component carrier 410B. The time interval T may be configured according to the temporary CSI reporting configuration. In some embodiments, the time interval T is shorter than the CSI reporting period of the secondary component carrier 410B of the mobile terminal 410 in the activation state S1. If the channel quality of the secondary cell can support the mobile terminal 410 to perform signal transmissions on the secondary cell through the secondary component carrier 410B, the mobile terminal 410 transmits a CQI of the secondary cell to the network terminal 420 through the primary component carrier 410A at the time that is time interval T after the latest CQI report. The contents of such CQI indicates that the mobile terminal 410 can perform signal transmissions on the secondary cell through the secondary component carrier 410B. Next, the mobile terminal 410 transmits a pre-assigned preamble M11 to the network terminal 420 through the secondary component carrier 410B to perform a random access procedure. That is, after transmitting the de-silence command, the network terminal 420 receives the CQI M9 from the mobile terminal 410 for every time interval T; after receiving the CQI M10, the network terminal 420 then performs a random access procedure with the mobile terminal 410.

After the step of transmitting the pre-assigned preamble M11, the network terminal 420 transmits a random access response M12 to the primary component carrier 410A or the secondary component carrier 410B of the mobile terminal 410 (the random access response M12 includes a timing advance (TA) value) for informing the mobile terminal 410 that it has received the pre-assigned preamble M11 correctly and for the mobile terminal 410 to restart the TAT and adjust the TA according to the TA value.

Finally, the mobile terminal 410 transmits an uplink scheduling M13 to the primary component carrier 410A or the secondary component carrier 410B of the mobile terminal 410 for indicating to the mobile terminal 410 to make the secondary component carrier 410B transition to the activation state S1 from the silence state S2 and restart or resume signal transmissions on the secondary cell (e.g., to transmit a data message M7 to the network terminal 420, or to receive a data message M7 from the network terminal 420).

Figure 5:
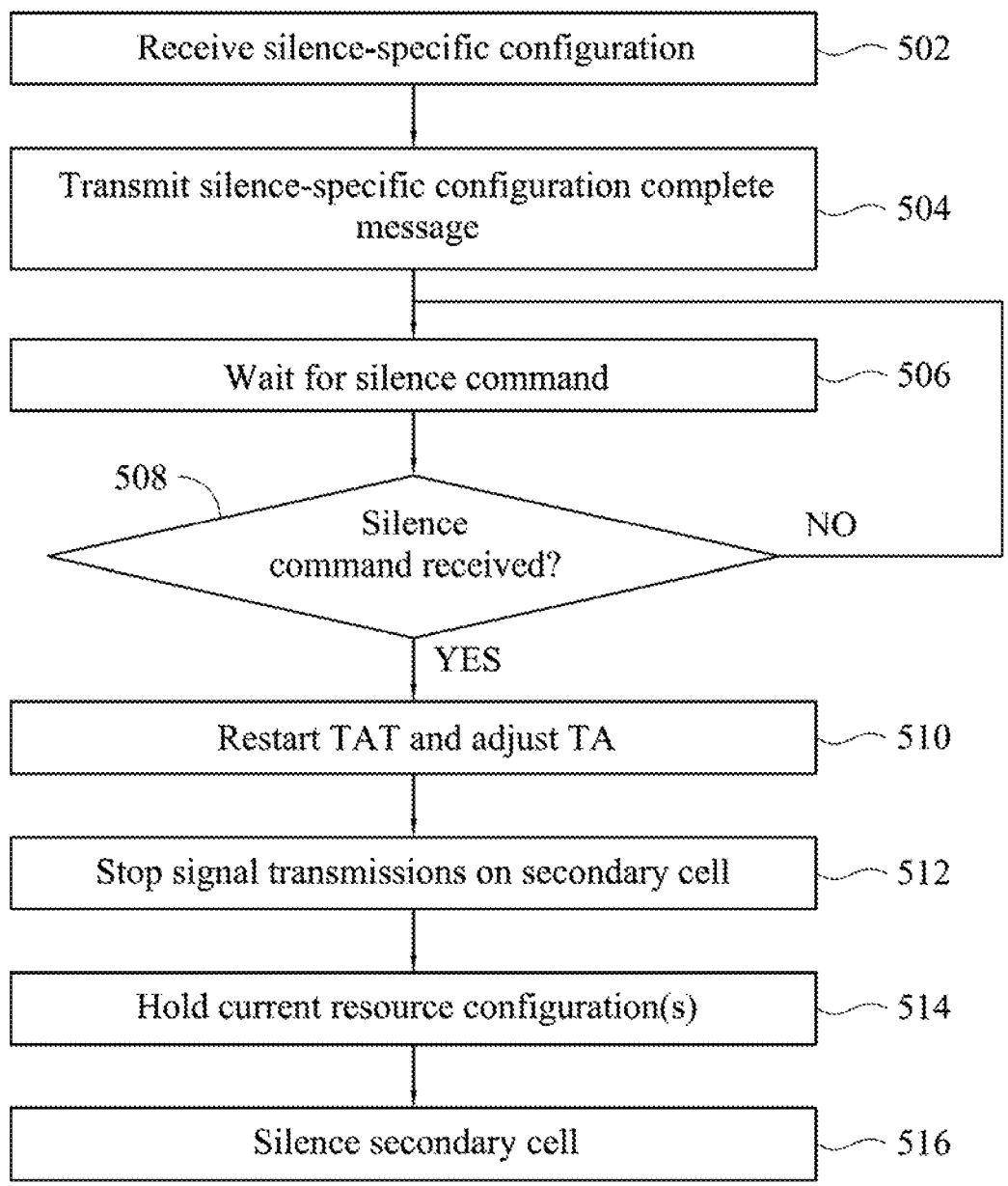
FIG. 5 illustrates a flowchart of a wireless communication control method in accordance with some embodiments of the invention.

Referring to FIG. 5, which illustrates a flowchart diagram of a wireless communication control method 500 in accordance with some embodiments of the invention. The wireless communication control method 500 may be performed by a mobile terminal which can be the mobile terminal 110 in FIG. 1, the mobile terminal 310 in FIG. 3 or a mobile terminal in another similar communication system. The mobile terminal includes a primary component carrier and a secondary component carrier, and the secondary component carrier is used to perform signal transmissions on a secondary cell operated in a frequency band of a shared spectrum or an unlicensed spectrum.

In step 502, the secondary component carrier of the mobile terminal is in the activation state, and the mobile terminal receives a silence-specific configuration from the network node. The silence-specific configuration may include a temporary CSI reporting configuration, a stop-transmitting timing and a silence-deactivation timer initial value, and is used for configuring the mobile terminal. The temporary CSI reporting configuration is used to indicate to the mobile terminal the configuration of temporary CSI reporting when reporting the CSI of the secondary cell after receiving the de-silence command from the network node. The stop-transmitting timing is used to indicate to the mobile terminal the timing to stop reporting CSI and to stop message transmissions on the secondary cell when receiving the silence command from the network node. The silence-deactivation timer initial value is used to configure the silence-deactivation timer associated with the secondary component carrier.

In step 504, the mobile terminal transmits a silence-specific configuration complete message to the network node for replying to the network node that the silence-specific configuration is received and the configuration according to the silence-specific configuration is accomplished.

In step 506, the mobile terminal waits for a silence command from the network node. Such silence command is used to indicate to the mobile terminal to make the secondary component carrier transition to the silence state from the activation state according to the silence command and the silence-specific configuration and operate in the silence state according to the silence-specific configuration. The secondary component carrier of the mobile terminal is kept in the activation state before the silence command is received. In some embodiments, the silence command includes a pre-assigned preamble which can be used in the transition process of the secondary component carrier of the mobile terminal from the silence state to the activation state.

In step 508, the mobile terminal verifies whether a silence command from the network node is received. If a silence command is received, the flow proceeds to step 510; otherwise, if no silence command is received, the flow proceeds back to step 506.

In step 510, the mobile terminal restarts the TAT and adjusts the TA according to the TA information of the silence command. The silence command may include a pre-assigned preamble used for a random access procedure after receiving a de-silence command from the network node.

In step 512, the mobile terminal stops signal transmissions on the secondary cell (including stopping CQI/PMI/RI reporting, stopping message transmissions on the secondary cell and/or stopping SRS transmissions) but remains monitoring downlink control channel and measuring RSRP/RSRQ on the secondary cell.

In step 514, the mobile terminal holds current resource configuration(s) of the secondary cell.

In step 516, the mobile terminal silences the secondary cell, such that the secondary component carrier is transitioned to the silence state from the activation state. The mobile terminal starts the silence-deactivation timer associated with the secondary component carrier when the secondary component carrier enters the silence state.

Figure 6A:
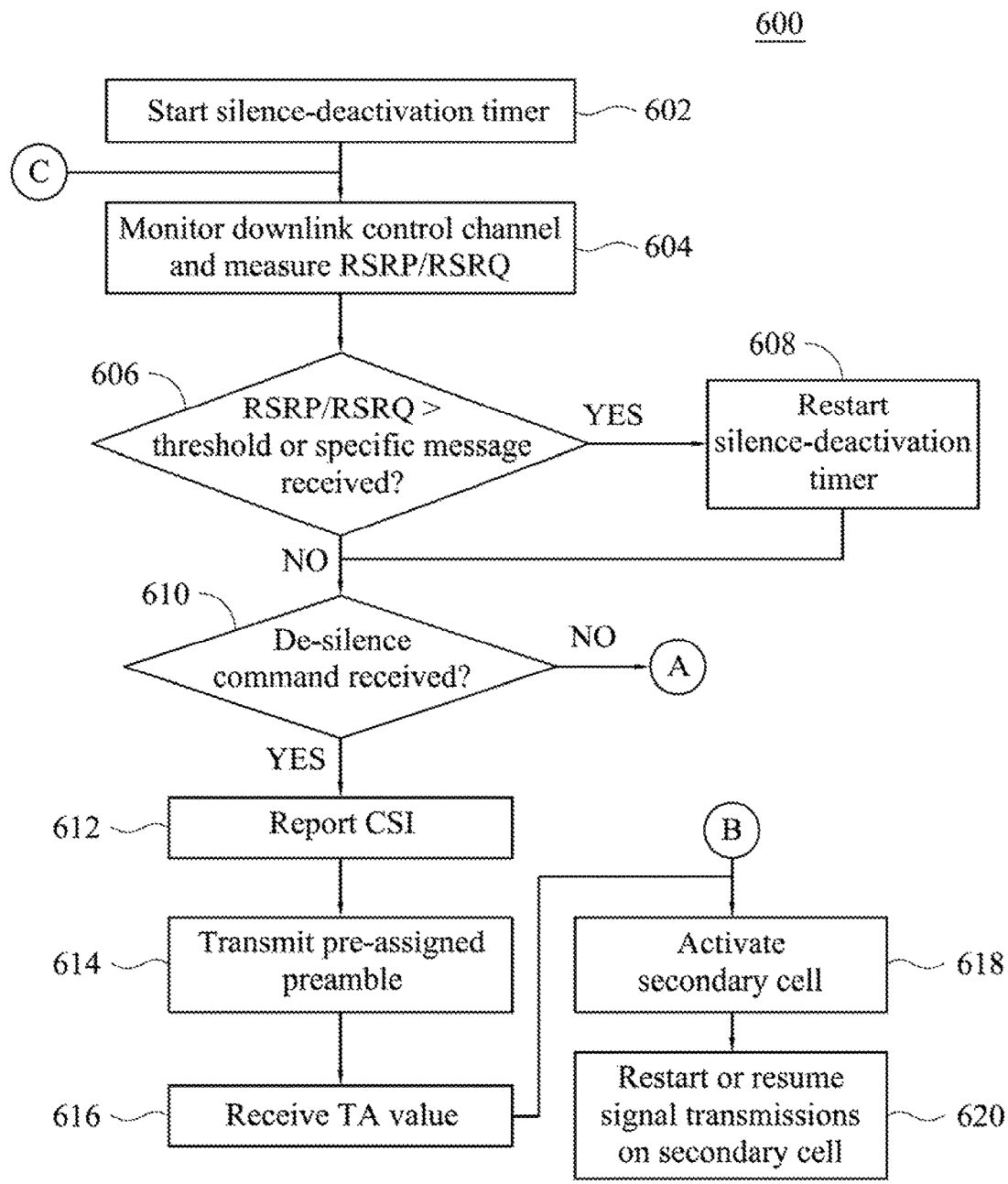
FIGS. 6A and 6B illustrate a flowchart of a wireless communication control method in accordance with some embodiments of the invention.
Figure 6B:
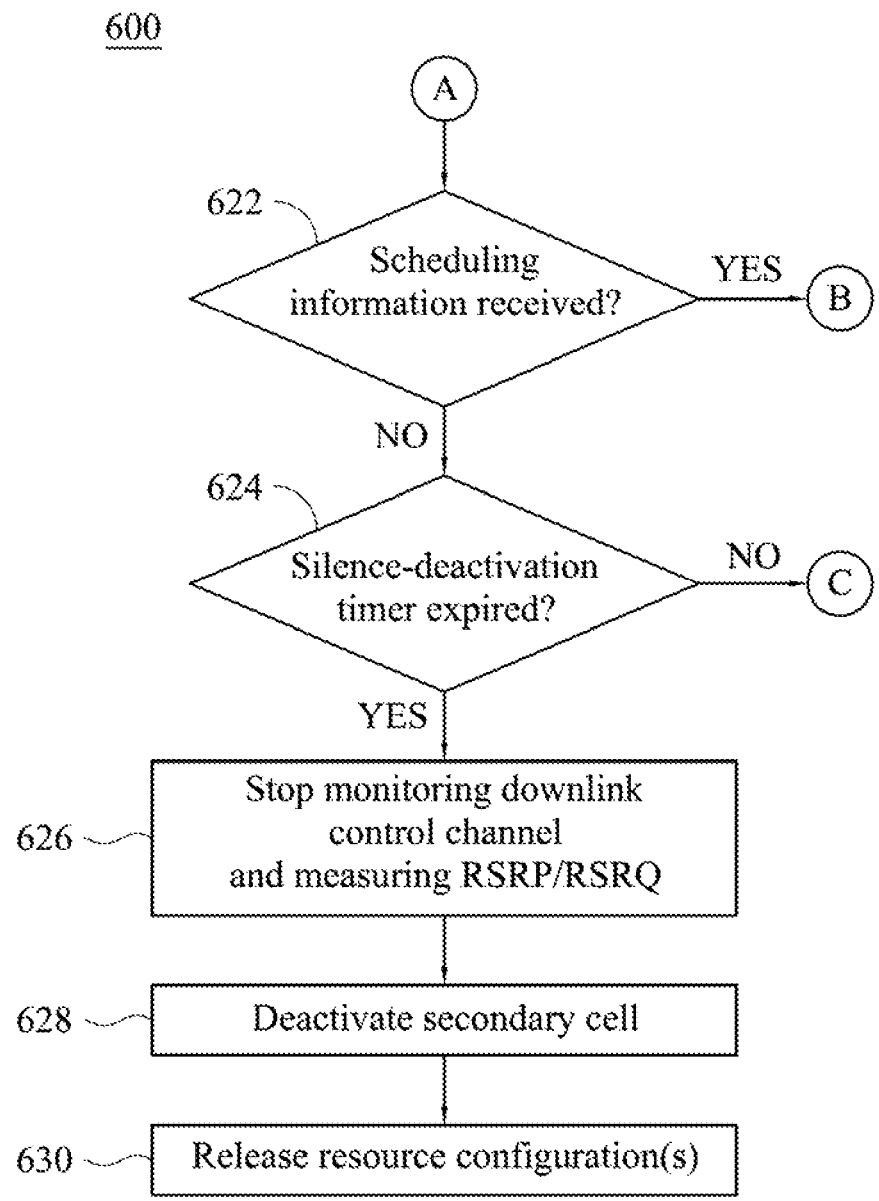

Referring to FIGS. 6A and 6B, which illustrate a flowchart diagram of a wireless communication control method 600 in accordance with some embodiments of the invention. The wireless communication control method 600 is performed by a mobile terminal which can be the mobile terminal 110 in FIG. 1, the mobile terminal 410 in FIGS. 4A and 4B or a mobile terminal in another similar communication system. The mobile terminal includes a primary component carrier and a secondary component carrier, and the secondary component carrier is configured to perform signal transmissions on a secondary cell operated in a frequency band of a shared spectrum or an unlicensed spectrum. The wireless communication control method 600 of FIGS. 6A and 6B may be a continuation of the wireless communication control method 500.

In step 602, the secondary component carrier of the mobile terminal transitions to the silence state from the activation state. The mobile terminal starts the silence-deactivation timer associated with the secondary component carrier when the secondary component carrier enters the silence state.

In step 604, the mobile terminal monitors the downlink control channel of the secondary cell and measures the RSRP/RSRQ, but does not perform signal transmissions on the secondary cell (including stopping CQI/PMI/RI reporting, stopping message transmissions on the secondary cell and/or stopping SRS transmissions).

In step 606, the mobile terminal determines whether the measured RSRP/RSRQ is higher than a threshold value and verifies whether any specific message is received. If the measured RSRP/RSRQ is higher than the threshold value or a specific message from the network node is received, the flow proceeds to step 608; otherwise, if the measured RSRP/RSRQ is lower than the threshold value and no specific message from the network node is received, the flow proceeds to step 610. Specifically, the mobile terminal may set an RSRP threshold and an RSRQ threshold in advance, and compares the measured RSRP and RSRQ with the RSRP threshold and the RSRQ threshold, respectively. If the measured RSRP is higher than the RSRP threshold or the measured RSRQ is higher than the RSRQ threshold, the flow process to step 608. In addition, the specific message can be any message for the mobile terminal to restart the silence-deactivation timer (e.g. a silence-deactivation timer reset command), but is not limited thereto.

In step 608, the mobile terminal restarts the silence-deactivation timer. After the silence-deactivation timer is restarted, the flow proceeds to step 610. In addition, after step 608 is accomplished, the mobile terminal may use the primary component carrier to transmit a restart silence-deactivation timer notification to the network node for informing the network node that the silence-deactivation timer has been restarted.

In step 610, the mobile terminal verifies whether it receives a de-silence command for indicting to the mobile terminal to make the secondary component carrier transition to the activation state from the silence state according to a silence-specific configuration. If the mobile terminal receives a de-silence command, the flow proceeds to step 612; otherwise, if the mobile terminal does not receive a de-silence command, the flow proceeds to step 622.

In step 612, the mobile terminal reports the CSI of the secondary cell to the network node according to the temporary CSI reporting configuration of the silence-specific configuration.

In step 614, the mobile terminal transmits a pre-assigned preamble to the network node. The pre-assigned preamble is included in the silence command used for the transition process of the secondary component carrier from the activation state to the silence state.

In step 616, the mobile terminal receives a TA value from the network node, and restarts the TAT and adjusts the TA according to the TA value.

In step 618, the mobile terminal activates the secondary cell, such that the secondary component carrier is transitioned to the activation state from the silence state.

In step 620, the secondary component carrier of the mobile terminal restarts or resumes signal transmissions on the secondary cell.

In step 622, the mobile terminal verifies whether it receives a scheduling information for indicating to the mobile terminal to make the secondary component carrier transition to the activation state from the silence state directly without performing a de-silence procedure (including steps 612, 614 and 616). If the mobile terminal receives a scheduling information, the flow proceeds to step 618; otherwise, if the mobile terminal does not receive a scheduling information, the flow proceeds to step 624.

In step 624, the mobile terminal verifies whether the silence-deactivation timer is expired. If the silence-deactivation timer is expired, the flow proceeds to step 626; otherwise, if the silence-deactivation timer is not expired, the flow proceeds to step 604.

In step 626, the mobile terminal stops monitoring the downlink control channel and measuring the RSRP/RSRQ on the secondary cell.

In step 628, the mobile terminal deactivates the secondary cell, such that the secondary component carrier is transitioned to the deactivation state from the silence state.

In step 630, the mobile terminal releases the resource configuration(s) of the secondary cell.

Figure 7:
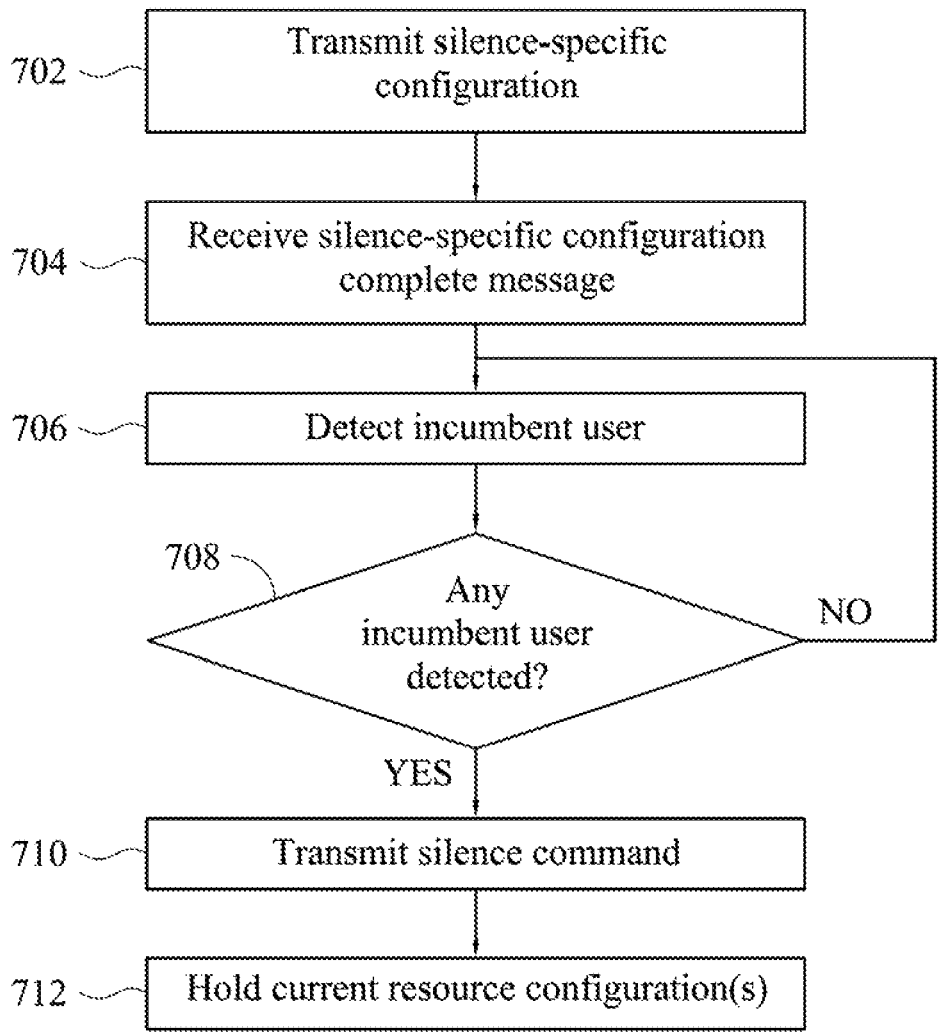
FIG. 7 illustrates a flowchart of a wireless communication control method in accordance with some embodiments of the invention.

Referring to FIG. 7, which illustrates a flowchart diagram of a wireless communication control method 700 in accordance with some embodiments of the invention. The wireless communication control method 700 is performed by a network node which can be the network node 122 or 124 of the communication system 100 in FIG. 1, the network node of the network terminal 320 in FIG. 3 or a network node in another similar communication system adopting DSS. The network node is configured to perform wireless communications with a mobile terminal and control the mobile terminal to access the wireless network.

In step 702, the network node transmits a silence-specific configuration to the mobile terminal. The silence-specific configuration may include a temporary CSI reporting configuration, a stop-transmitting timing and a silence-deactivation timer initial value, and is used for configuring the mobile terminal. The temporary CSI reporting configuration is used to indicate to the mobile terminal the configuration of temporary CSI reporting when reporting the CSI of the secondary cell after receiving a de-silence command from the network node. The stop-transmitting timing is used to indicate to the mobile terminal the timing to stop reporting CSI and to stop message transmissions on the secondary cell after receiving a silence command from the network node. The silence-deactivation timer initial value is used to configure the silence-deactivation timer associated with the secondary component carrier of the mobile terminal.

In step 704, the network node receives a silence-specific configuration complete message from the mobile terminal for confirmation that the silence-specific configuration is received and the configuration according to the silence-specific configuration is accomplished at the mobile terminal.

In step 706, the network node performs detection of an incumbent user in the secondary cell. The incumbent user has higher priority to access the frequency band of the secondary cell than the mobile terminal.

In step 708, the network node verifies whether there is any incumbent user with higher priority to access the frequency band of the secondary cell than the mobile terminal in the secondary cell. If an incumbent user is detected, the flow proceeds to step 710; otherwise, if no incumbent user is detected, the flow proceeds back to step 706.

In step 710, the network node transmits a silence command to the mobile terminal for indicating to the mobile terminal to make the secondary component carrier transition to the activation state from the silence state and operate in the silence state according to the previously received silence-specific configuration. In some embodiments, the silence command includes a pre-assigned preamble which can be used in the transition process of the secondary component carrier of the mobile terminal from the silence state to the activation state.

In step 712, the network node holds current resource configuration(s) of the secondary cell.

Figure 8A:
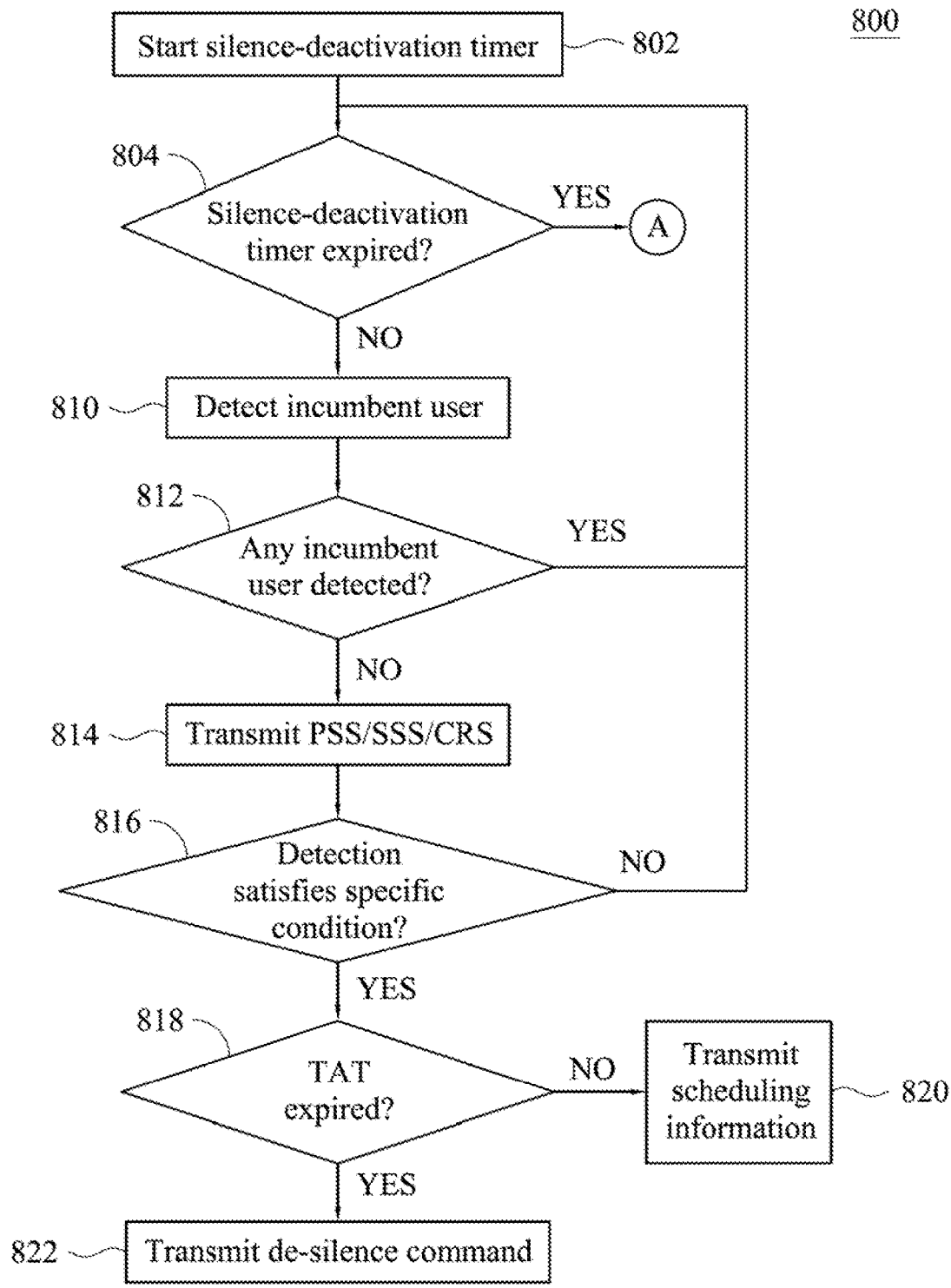
FIGS. 8A and 8B illustrate a flowchart of a wireless communication control method in accordance with some embodiments of the invention.
Figure 8B:
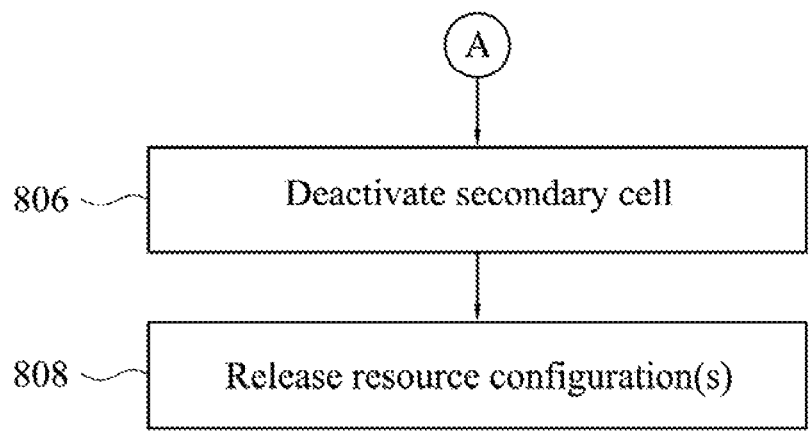

Referring to FIGS. 8A and 8B, which illustrate a flowchart diagram of a wireless communication control method 800 in accordance with some embodiments of the invention. The wireless communication control method 800 is performed by a network node which can be the network node 122 or 124 of the communication system 100 in FIG. 1, the network node of the network terminal 420 in FIGS. 4A and 4B or a network node in another similar communication system adopting DSS. The network node is configured to perform wireless communications with a mobile terminal and control the mobile terminal to access the wireless network. The wireless communication control method 800 of FIGS. 8A and 8B may be a continuation of the wireless communication control method 700 in FIG. 7.

In step 802, the network node transmits a silence command to the mobile terminal, such that the secondary component carrier of the mobile terminal is transitioned to the silence state from the activation state and starts the silence-deactivation timer associated with the secondary component carrier of the mobile terminal according to the stop-transmitting timing after sending the silence command.

In step 804, the network node verifies whether the silence-deactivation timer is expired. If the silence-deactivation timer is expired, the flow proceeds to step 806; otherwise, if the silence-deactivation timer is not expired, the flow proceeds to step 810.

In step 806, the network node deactivates the secondary cell, such that the secondary component carrier of the mobile terminal is transitioned to the deactivation state from the silence state.

In step 808, the network node releases the resource configuration(s) of the secondary cell.

In step 810, the network node performs detection of an incumbent user in the secondary cell. The incumbent user has higher priority to access the frequency band of the secondary cell than the mobile terminal.

In step 812, the network node verifies whether there is any incumbent user with higher priority to access the frequency band of the secondary cell than the mobile terminal in the secondary cell. If an incumbent user is detected, the flow proceeds back to step 804; otherwise, if no incumbent user is detected, the flow proceeds to step 814.

In step 814, the network node transmits a PSS/SSS/CRS to the mobile terminal for synchronization with the mobile terminal.

In step 816, the network node verifies whether the detection of the incumbent users satisfies a specific condition. The specific condition may be that no incumbent user with higher priority to access the frequency band of the secondary cell than the mobile terminal is detected by the network node in a predetermined time duration. If the detection of the incumbent users satisfies the condition, the flow proceeds to step 818; otherwise, if the detection of the incumbent users does not satisfy the condition, the flow proceeds back to step 804.

In step 818, the network node verifies whether the TAT timer associated with the secondary cell is expired. If the TAT is not expired, the flow proceeds to step 820; otherwise, if the TAT is expired, the flow proceeds to step 822.

In step 820, the network node transmits a scheduling information to the mobile terminal. The scheduling information is used to indicate to the mobile terminal to make the secondary component carrier transition to the activation state from the silence state directly without performing a de-silence procedure (including steps 612, 614 and 616 in FIG. 6A).

In step 822, the network node transmits a de-silence command to the mobile terminal. The de-silence command is used to indicate to the mobile terminal to perform a de-silence procedure (including steps 612, 614 and 616 in FIG. 6A) and to make the secondary component carrier transition to the activation state from the silence state after the de-silence procedure.

Figure 9:
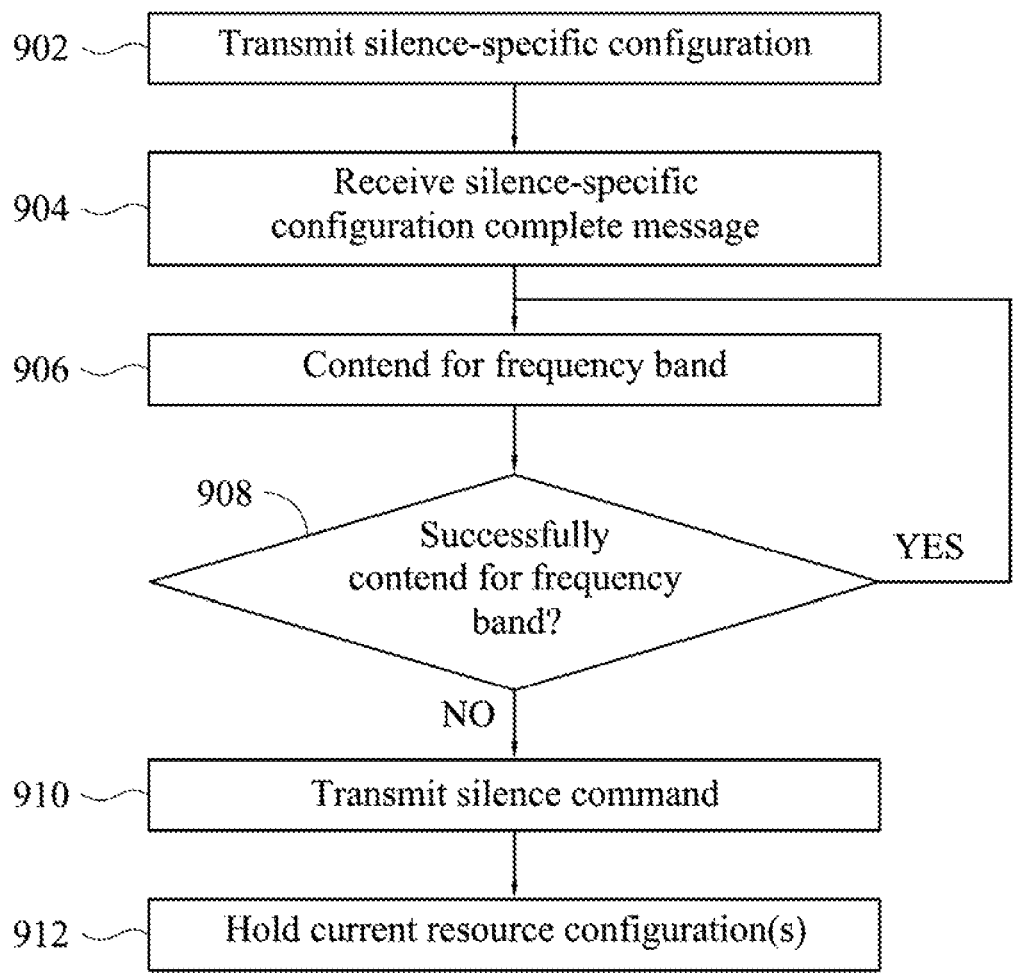
FIG. 9 illustrates a flowchart of a wireless communication control method in accordance with some embodiments of the invention.

Referring to FIG. 9, which illustrates a flowchart diagram of a wireless communication control method 900 in accordance with some embodiments of the invention. The wireless communication control method 900 is performed by a network node which can be the network node 122 or 124 of the communication system 100 in FIG. 1, the network node of the network terminal 320 in FIG. 3 or a network node in another similar communication system adopting LAA. The network node is configured to perform wireless communications with a mobile terminal and control the mobile terminal to access the wireless network.

In step 902, the network node transmits a silence-specific configuration to the mobile terminal. The silence-specific configuration may include a temporary CSI reporting configuration, a stop-transmitting timing and a silence-deactivation timer initial value, and is used for configuring the mobile terminal. The temporary CSI reporting configuration is used to indicate to the mobile terminal the configuration of temporary CSI reporting when reporting the CSI of the secondary cell after receiving the de-silence command from the network node. The stop-transmitting timing is used to indicate to the mobile terminal the timing to stop reporting CSI and to stop message transmissions on the secondary cell after receiving a silence command from the network node. The silence-deactivation timer initial value is used to configure the silence-deactivation timer associated with the secondary component carrier of the mobile terminal.

In step 904, the network node receives a silence-specific configuration complete message from the mobile terminal for confirmation that the silence-specific configuration is received and the configuration according to the silence-specific configuration is accomplished at the mobile terminal.

In step 906, the network node contends for access to the frequency band of the secondary cell for continuing signal transmissions with the mobile terminal on the secondary cell.

In step 908, the network node verifies whether it successfully contends for access to the frequency band of the secondary cell. If the network node fails to contend for access to the frequency band of the secondary cell, the flow proceeds to step 910; otherwise, if the network node successfully contends for access to the frequency band of the secondary cell, the flow proceeds back to step 906.

In step 910, the network node transmits a silence command to the mobile terminal for indicating to the mobile terminal to make the secondary component carrier transition to the activation state from the silence state and operate in the silence state in accordance with the previously received silence-specific configuration. In some embodiments, the silence command includes a pre-assigned preamble which can be used in the transition process of the secondary component carrier of the mobile terminal from the silence state to the activation state.

In step 912, the network node holds current resource configuration(s) of the secondary cell.

It is noted that, in other embodiments, the wireless communication control method 900 may determine the state of the secondary component carrier of the mobile terminal according to whether there are any data to be transmitted to the secondary component carrier of the mobile terminal. For example, step 906 may alternatively be waiting for any data to be transmitted to the secondary component carrier of the mobile terminal, and step 908 may be correspondingly verifying if there are any data to be transmitted to the secondary component carrier of the mobile terminal in a predetermined time duration. If yes, the flow proceeds to step 906; otherwise the flow proceeds to step 910.

Figure 10A:
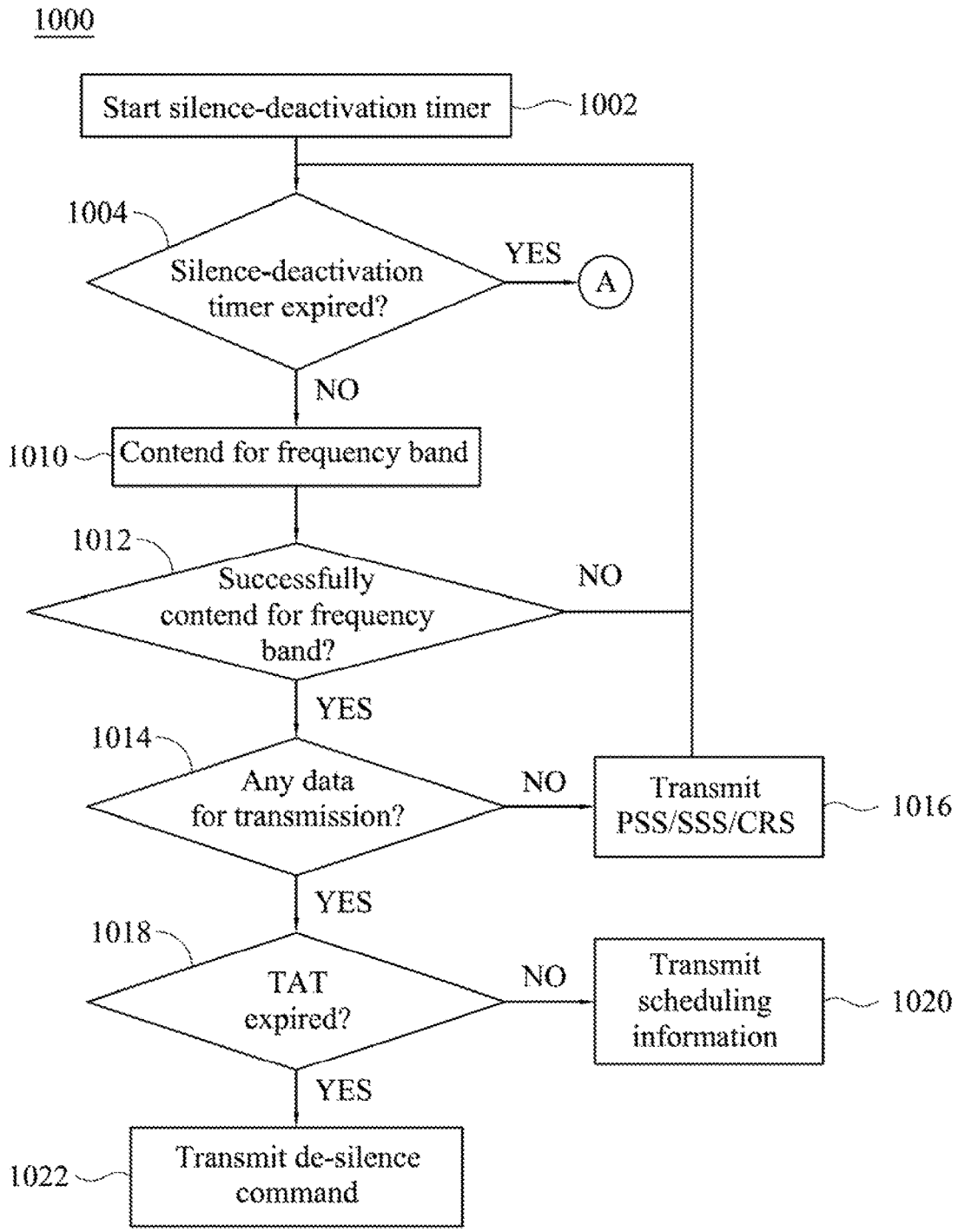
FIGS. 10A and 10B illustrate a flowchart of a wireless communication control method in accordance with some embodiments of the invention.
Figure 10B:
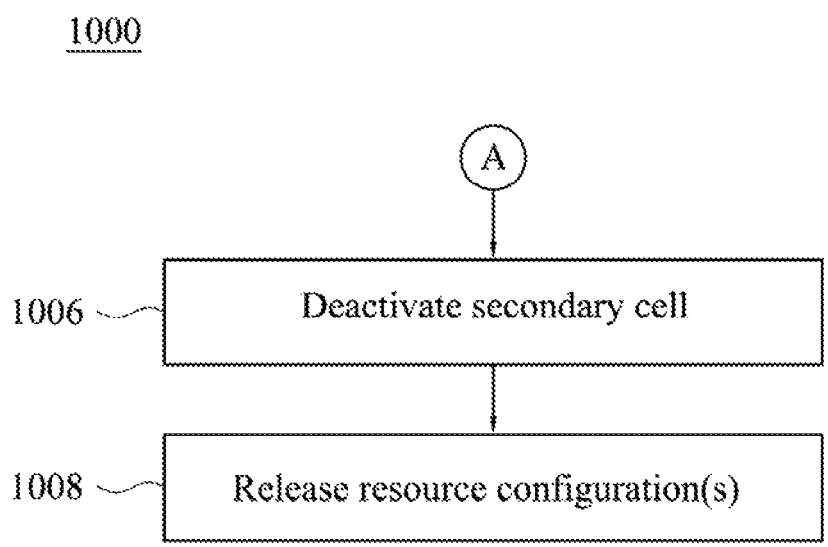

Referring to FIGS. 10A and 10B, which illustrate a wireless communication control method 1000 in accordance with some embodiments of the invention. The wireless communication control method 1000 is performed by a network node which can be the network node 122 or 124 of the communication system 100 in FIG. 1, the network node of the network terminal 420 in FIGS. 4A and 4B or a network node in another similar communication system adopting LAA. The network node is configured to perform wireless communications with a mobile terminal and control the mobile terminal to access the wireless network. The wireless communication control method 1000 in FIGS. 10A and 10B may be a continuation of the wireless communication control method 900 in FIG. 9.

In step 1002, the network node transmits a silence command to the mobile terminal, such that the secondary component carrier of the mobile terminal is transitioned to the silence state from the activation state and starts the silence-deactivation timer associated to the secondary component carrier of the mobile terminal according to the stop-transmitting timing after sending the silence command.

In step 1004, the network node verifies whether the silence-deactivation timer is expired. If the silence-deactivation timer is expired, the flow proceeds to step 1006; otherwise, if the silence-deactivation timer is not expired, the flow proceeds to step 1010.

In step 1006, the network node deactivates the secondary cell, such that the secondary component carrier of the mobile terminal is transitioned to the deactivation state from the silence state.

In step 1008, the network node releases the resource configuration(s) of the secondary cell.

In step 1010, the network node contends for access to the frequency band of the secondary cell for signal transmissions with the mobile terminal on the secondary cell.

In step 1012, the network node verifies whether it successfully contends for access to the frequency band of the secondary cell. If the network node successfully contends for access to the frequency band of the secondary cell, the flow proceeds to step 1014; otherwise, if the network node fails to contend for access to the frequency band of the secondary cell, the flow proceeds back to step 1004.

In step 1014, the network node verifies whether there are any data to be transmitted to the mobile terminal on the secondary cell. If there is no data to be transmitted to the mobile terminal on the secondary cell, the flow proceeds to step 1016; otherwise, if there is data to be transmitted to the mobile terminal on the secondary cell, the flow proceeds to step 1018.

In step 1016, the network node transmits a PSS/SSS/CRS to the mobile terminal for synchronization with the mobile terminal. After the PSS/SSS/CRS is transmitted, the flow proceeds back to step 1004.

In step 1018, the network node verifies whether the TAT associated with the secondary cell is expired. If the TAT is not expired, the flow proceeds to step 1020; otherwise, if the TAT is expired, the flow proceeds to step 1022.

In step 1020, the network node transmits a scheduling information to the mobile terminal. The scheduling information is used to indicate to the mobile terminal to make the secondary component carrier transition to the activation state from the silence state directly without performing a de-silence procedure (including steps 612, 614 and 616 in FIG. 6A).

In step 1022, the network node transmits a de-silence command to the mobile terminal. The de-silence command is used to indicate to the mobile terminal to perform a de-silence procedure (including steps 612, 614 and 616 in FIG. 6A) and to make the secondary component carrier transition to the activation state from the silence state after the de-silence procedure.

The advantages of the invention include at least include the following. The secondary component carrier of the mobile terminal remains monitoring downlink control channel and measuring RSRP/RSRQ on the secondary cell, without releasing the resource configurations of the secondary cell. Therefore, the state transition time of the secondary component carrier of the mobile terminal exiting the activation state and back to the activation state again can be reduced, and the efficiency of spectrum resource usage can be effectively improved. In addition, the mobile terminal does not affect the access priority of the incumbent user to the unlicensed spectrum or shared spectrum.

Figure 11:
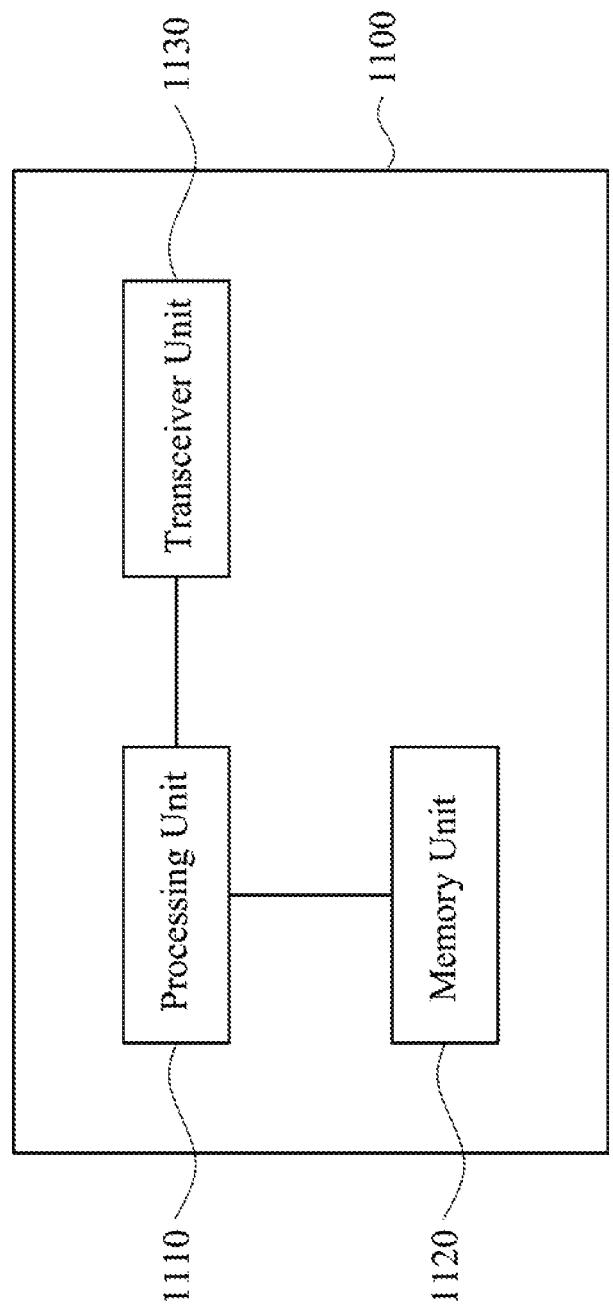
FIG. 11 illustrates a block diagram of an apparatus in accordance with some embodiments of the invention.

Referring to FIG. 11, which illustrates a schematic diagram of an apparatus 1100 in accordance with some embodiments of the invention. The apparatus 1100 may be the mobile terminal 110 or the network node 122 in FIG. 1, a mobile terminal which performs the wireless communication control method 500 or 600, or a network node which performs the wireless communication control method 700, 800, 900 or 1000. The apparatus 1100 includes a processing unit 1110, a memory unit 1120 and a transceiver unit 1130. The processing unit 1110 may be, for example, a conventional processor, a digital signal processor (DSP), a microprocessor or an application-specific integrated circuit (ASIC), but is not limited thereto. The method 500, 600, 700, 800, 900 or 1000 may be compiled into a program code, and such compiled program code may be stored in the memory unit 1120. If the apparatus 1100 is the mobile terminal 110 in FIG. 1 or a mobile terminal which performs the wireless communication control method 500 or 600, the memory unit 1120 is configured to store the program code corresponding to the wireless communication control method 500 or 600. Oppositely, if the apparatus 1100 is the network node 122 in FIG. 1 or a network node which performs the wireless communication control method 700, 800, 900 or 1000, the memory unit 1120 is configured to store the program code corresponding to the wireless communication control method 700, 800, 900 or 1000. When the apparatus 1100 communicates with a remote entity, the processing unit 1110 may read and execute the program code stored in the memory unit 1120 to perform a corresponding operation (i.e. the wireless communication control method 500, 600, 700, 800, 900 or 1000).

The memory unit 1120 may be any data storage device which may be read and executed by the processing unit 1110. The memory unit 1120 may be, for example, a subscriber identity module (SIM), a read-only memory (ROM), an erasable programmable ROM (EPROM), an electrically erasable programmable ROM (EEPROM), a random access memory (RAM), a CD-ROM, a magnetic tape, a hard disk, a solid state disk (SSD), a flash memory or other data storage device suitable for storing a program code, but is not limited thereto. The transceiver unit 1130 may be a radio transceiver for performing wireless communications with a remote entity based on the operation result of the processing unit 1110. For example, if the apparatus 1100 is the mobile terminal 110 in FIG. 1, the transceiver unit 1130 performs wireless communications with the network nodes 122 and 124 in the network terminal 120; if the apparatus 1100 is the network node 122 in FIG. 1, the transceiver unit 1130 performs wireless communications with the mobile terminal 110.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A method for wireless communications, comprising:
   transmitting a silence command to a mobile terminal by a network node when a first predetermined condition occurs;
   making a secondary component carrier of the mobile terminal transition to a silence state from an activation state according to the silence command and a silence-specific configuration and operate in the silence state according to the silence-specific configuration, wherein the silence-specific configuration is used to configure the mobile terminal by the network node, and the silence state is defined as a state in which the mobile terminal stops signal transmissions to the network node on a secondary cell but remains monitoring downlink control channel and measuring Reference Signal Received Power (RSRP)/Reference Signal Received Quality (RSRQ) on the secondary cell, wherein the secondary cell is served by the network node which uses a secondary component carrier that corresponds to the secondary component carrier of the mobile terminal, which is in a frequency band of a shared spectrum or an unlicensed spectrum;
   transmitting a signaling message to the mobile terminal by the network node when a second predetermined condition occurs; and
   making the secondary component carrier of the mobile terminal transition to the activation state from the silence state according to the silence-specific configuration and restart or resume message signal transmissions on the secondary cell in accordance with the signaling message;
   wherein the signaling message is a de-silence command if a time alignment timer (TAT) associated with the secondary cell is expired when the second predetermined condition occurs, wherein the de-silence command is used to control the mobile terminal to perform a de-silence procedure before the secondary component carrier transitions to the activation state from the silence state;
   wherein the silence command comprises a pre-assigned preamble, and the de-silence procedure comprises:
      reporting channel state information (CSI) of the secondary cell in accordance with a temporary CSI reporting configuration of the silence-specific configuration;
      transmitting the pre-assigned preamble to the network node; and
      receiving a timing advance (TA) value from the network node.

2. The method of claim 1, wherein the first predetermined condition is that an incumbent user is detected by the network node, and the second predetermined condition is that the incumbent user or another incumbent user is not detected for a predetermined time duration by the network node, wherein the incumbent user and the other incumbent user have higher priority to access the frequency band than the mobile terminal.

3. The method of claim 1, wherein the first predetermined condition is that the network node fails to contend for access to the frequency band, and the second predetermined condition is that the network node successfully contends for access to the frequency band.

4. The method of claim 1, wherein the silence-specific configuration further comprises a stop-transmitting timing for the mobile terminal to stop reporting CSI and to stop message transmissions on the secondary cell at the indicated timing and a silence-deactivation timer initial value for configuring a silence-deactivation timer associated with the secondary component carrier, wherein the silence-deactivation timer is started when the secondary component carrier enters the silence state.

5. The method of claim 4, further comprising:
   stopping monitoring downlink control channel and measuring RSRP/RSRQ on the secondary cell at the mobile terminal when the silence-deactivation timer expires.

6. The method of claim 4, further comprising:
   restarting the silence-deactivation timer when receiving a silence-deactivation timer restart command from the network node at the mobile terminal.

7. The method of claim 1, wherein the signaling message comprises scheduling information for restarting or resuming signal transmissions on the secondary cell if the TAT associated with the secondary cell is not expired when the second predetermined condition occurs.

8. An apparatus for wireless communications, comprising:
a radio transceiver configured for signal transmissions and receptions on a secondary cell, wherein the radio transceiver is associated with a secondary component carrier of the apparatus, and the secondary cell is served by a network node and is operated in a frequency band of a shared spectrum or an unlicensed spectrum; and
a processor configured to perform the following operations:
receiving a silence command from the network node;
making the secondary component carrier transition to a silence state from an activation state according to the silence command and a silence-specific configuration and operate in accordance with the silence-specific configuration, wherein the silence-specific configuration is used to configure the apparatus by the network node, and the silence state is defined as a state in which the apparatus stops signal transmissions on the secondary cell but remains monitoring downlink control channel and measuring Reference Signal Received Power (RSRP)/Reference Signal Received Quality (RSRQ) on the secondary cell;
receiving a signaling message from the network node; and
making the secondary component carrier transition to the activation state from the silence state according to the silence-specific configuration and restart or resume signal transmissions on the secondary cell in accordance with the signaling message;
wherein the silence command comprises a pre-assigned preamble, and if the signaling message is a de-silence command, the processor is further configured to perform the following operations before the secondary component carrier transitions to the activation state from the silence state in accordance with the de-silence command:
reporting channel state information (CSI) of the secondary cell in accordance with a temporary CSI reporting configuration of the silence-specific configuration;
transmitting the pre-assigned preamble to the network node; and
receiving a timing advance (TA) value from the network node.

9. The apparatus of claim 8, wherein the silence-specific configuration further comprises a stop-transmitting timing for the apparatus to stop reporting CSI and to stop message transmissions on the secondary cell at the indicated timing and a silence-deactivation timer initial value for configuring a silence-deactivation timer associated with the secondary component carrier, wherein the silence-deactivation timer is started when the secondary component carrier enters the silence state.

10. The apparatus of claim 9, wherein the processor is further configured to perform the following operation:
stopping monitoring downlink control channel and measuring RSRP/RSRQ on the secondary cell when the silence-deactivation timer expires.

11. The apparatus of claim 9, wherein the processor is further configured to perform the following operation:
restarting the silence-deactivation timer when receiving a silence-deactivation timer restart command from the network node.

12. An apparatus for wireless communications, comprising:
a radio transceiver configured for signal transmissions and receptions with a mobile terminal; and
a processor configured to perform the following operations:
transmitting a silence command to a mobile terminal when a first predetermined condition occurs, wherein the silence command is used to indicate to the mobile terminal to make a secondary component carrier of the mobile terminal transition to a silence state from an activation state according to the silence command and a silence-specific configuration and operate in accordance with the silence-specific configuration, wherein the silence-specific configuration is used to configure the mobile terminal by the apparatus, and the silence state is defined as a state in which the mobile terminal stops signal transmissions on a secondary cell served by the apparatus using a secondary component carrier that corresponds to the secondary component carrier of the mobile terminal, but remains monitoring downlink control channel and measuring Reference Signal Received Power (RSRP)/Reference Signal Received Quality (RSRQ) on the secondary cell operated in a frequency band of a shared spectrum or an unlicensed spectrum; and
transmitting a signaling message to the mobile terminal for indicating to the mobile terminal to make the secondary component carrier transition to the activation state from the silence state and restart or resume signal transmissions on the secondary cell in accordance with the silence-specific configuration when a second predetermined condition occurs;
wherein the silence command comprises a pre-assigned preamble, and the signaling message is a de-silence command if a time alignment timer (TAT) associated with the secondary cell is expired when the second predetermined condition occurs, wherein the de-silence command is used to indicate to the mobile terminal to perform the following operations before the secondary component carrier transitions to the activation state from the silence state:
reporting channel state information (CSI) of the secondary cell in accordance with a temporary CSI reporting configuration of the silence-specific configuration;
transmitting the pre-assigned preamble to the apparatus; and
receiving a timing advance (TA) value from the apparatus.

13. The apparatus of claim 12, wherein the first predetermined condition is that an incumbent user is detected by the apparatus, and the second predetermined condition is that the incumbent user or another incumbent user is not detected for a predetermined time duration by the apparatus, wherein the incumbent user and the other incumbent user have higher priority to access the frequency band than the mobile terminal.

14. The apparatus of claim 12, wherein the first predetermined condition is that the apparatus fails to contend for access to the frequency band, and the second predetermined condition is that the apparatus successfully contends for access to the frequency band.

15. The apparatus of claim 12, wherein the silence-specific configuration further comprises a stop-transmitting timing for the mobile terminal to stop reporting CSI and to stop message transmissions on the secondary cell at the indicated timing and a silence-deactivation timer initial value for configuring a silence-deactivation timer associated with the secondary component carrier, wherein the silence-deactivation timer is started when the secondary component carrier enters the silence state.

16. The apparatus of claim 12, wherein the signaling message comprises scheduling information for restarting or resuming signal transmissions on the secondary cell if the TAT associated with the secondary cell is not expired when the second predetermined condition occurs.

* * * * *